(12) United States Patent
Zhao et al.

(10) Patent No.: US 11,822,186 B2
(45) Date of Patent: Nov. 21, 2023

(54) ARRAY SUBSTRATES AND LIQUID CRYSTAL DISPLAY PANELS THEREOF

(71) Applicants: Chongqing BOE Optoelectronics Technology Co., Ltd., Chongqing (CN); BOE Technology Group Co., Ltd., Beijing (CN)

(72) Inventors: Yanli Zhao, Beijing (CN); Xiaoji Li, Beijing (CN); Hailong Wu, Beijing (CN); Gang Chen, Beijing (CN); He Sun, Beijing (CN); Di Wang, Beijing (CN); Yu Wang, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 173 days.

(21) Appl. No.: 17/628,149

(22) PCT Filed: Mar. 12, 2021

(86) PCT No.: PCT/CN2021/080591
§ 371 (c)(1),
(2) Date: Jan. 18, 2022

(87) PCT Pub. No.: WO2021/227640
PCT Pub. Date: Nov. 18, 2021

(65) Prior Publication Data
US 2022/0276538 A1   Sep. 1, 2022

(30) Foreign Application Priority Data

May 11, 2020 (CN) .......................... 202010393943.0

(51) Int. Cl.
*G02F 1/1337* (2006.01)
*G02F 1/137* (2006.01)
(Continued)

(52) U.S. Cl.
CPC .... *G02F 1/133707* (2013.01); *G02F 1/13439* (2013.01); *G02F 1/13793* (2021.01); *G02F 1/133514* (2013.01); *G02F 1/134309* (2013.01)

(58) Field of Classification Search
CPC ........... G02F 1/133707; G02F 1/13793; G02F 1/133514; G02F 1/134309; G02F 1/13439
See application file for complete search history.

(56) References Cited

U.S. PATENT DOCUMENTS

2016/0299392 A1* 10/2016 Cheng ............... G02F 1/133707
2017/0139282 A1   5/2017 Wu

FOREIGN PATENT DOCUMENTS

CN          203573051 U    4/2014
CN          104536218 A    4/2015
(Continued)

OTHER PUBLICATIONS

PCT/CN2021/080591 international search report.

*Primary Examiner* — Anne M Hines
(74) *Attorney, Agent, or Firm* — IPro, PLLC

(57) ABSTRACT

An array substrate and a liquid crystal display panel thereof. The array substrate includes a substrate having a plurality of pixel regions arranged in an array. Each of the pixel regions (120a) includes: a first electrode, a second electrode, an insulation protrusion, and a reflection electrode. An electric field is fit to form between the second electrode and the first electrode, and an electric field is also fit to form between the reflection electrode and the second electrode. The second electrode includes a slit electrode, which includes a plurality of slit portions and a plurality of electrode portions each arranged between adjacent slit portions. The electrode portion at least includes a first strip-shaped portion and a second strip-shaped portion. An extension direction of the first strip-shaped portion intersects with that of the second strip-
(Continued)

shaped portion, and the first strip and second strip-shaped portions of each electrode portion are connected at a corresponding bending portion. For orthographic projections in a plane where the substrate is located, bending portions of the second electrode and the reflection electrode are located within the insulation protrusion.

20 Claims, 7 Drawing Sheets

(51) Int. Cl.
*G02F 1/1335* (2006.01)
*G02F 1/1343* (2006.01)

(56) References Cited

FOREIGN PATENT DOCUMENTS

| | | | |
|---|---|---|---|
| CN | 204945583 U | 1/2016 | |
| CN | 106200154 A | 12/2016 | |
| CN | 108828852 A | 11/2018 | |
| CN | 111443535 A | 7/2020 | |
| JP | 2008015229 A | 1/2008 | |
| JP | 2010175790 A | 8/2010 | |

* cited by examiner

ARRAY SUBSTRATES AND LIQUID CRYSTAL DISPLAY PANELS THEREOF

CROSS REFERENCE TO RELATED APPLICATIONS

This application is the US national phase of PCT application No. PCT/CN2021/080591 filed on Mar. 12, 2021, which claims priority to Chinese Patent Application No. 2020103939430 entitled "ARRAY SUBSTRATE AND LIQUID CRYSTAL DISPLAY PANEL THEREOF" filed on May 11, 2020, the entire content of which is incorporated herein by reference.

TECHNICAL FIELD

The present disclosure relates to the technical field of display devices, and in particular to an array substrate and a liquid crystal display panel thereof.

BACKGROUND

Thin Film Transistor-Liquid Crystal Displays (TFT-LCD) features small volume, low power consumption, no radiation and the like. In recent years, the TFT-LCDs witness fast development and take a leading position in the current flat panel display market. Currently, based on display mode, the TFT-LCDs are divided into a Twisted Nematic (TN) type, an In Plane Switching (IPS) type, and an Advanced Super Dimension Switch (ADS) type. The ADS liquid crystal displays are widely applied due to its advantages of wide view angle, high aperture ratio, high transmittance, high resolution, fast response speed, low power consumption, low chromatic aberration and the like, and become one of important technologies in liquid crystal display field.

SUMMARY

A first aspect of embodiments of the present disclosure provides an array substrate, including a substrate, wherein the substrate has a plurality of pixel regions arranged in an array and each of the pixel regions includes:
  a first electrode;
  a second electrode, located at a side of the first electrode away from the substrate, where an electric field is fit to form between the second electrode and the first electrode, the second electrode comprises a slit electrode, the slit electrode comprises a plurality of electrode portions and one or more slit portions each arranged between adjacent electrode portions, each of the electrode portions at least comprises a first strip-shaped portion and a second strip-shaped portion, an extension direction of the first strip-shaped portion intersects with an extension direction of the second strip-shaped portion, and the first strip-shaped portion and the second strip-shaped portion of each electrode portion are connected at a corresponding bending portion;
  an insulation protrusion, located at a side of the second electrode away from the first electrode, where an orthographic projection of bending portions of the second electrode in a plane where the substrate is located is within an orthographic projection of the insulation protrusion in the plane where the substrate is located; and
  a reflection electrode, located at a side of the insulation protrusion away from the second electrode, where an electric field is fit to form between the reflection electrode and the second electrode, and an orthographic projection of the reflection electrode in the plane where the substrate is located is within the orthographic projection of the insulation protrusion in the plane where the substrate is located.

Optionally, the reflection electrode is electrically connected with the first electrode.

Optionally, the first electrode is a common electrode and the second electrode is a pixel electrode.

Optionally, the insulation protrusion extends along a row direction, and orthographic projections of bending portions of the second electrodes of one row of the pixel regions in the plane where the substrate is located are within orthographic projections of one corresponding row of insulation protrusions in the plane where the substrate is located.

Optionally, the reflection substrate extends along the row direction, and orthographic projections of one row of the reflection electrodes in the plane where the substrate is located are within orthographic projections of one corresponding row of the insulation protrusions in the plane where the substrate is located.

Optionally, common electrodes of the plurality of pixel regions are connected to form a planar electrode.

Optionally, a dielectric constant of the insulation protrusion is between 20 and 30; and/or, a material of the insulation protrusion comprises at least one of $TiO_2$ nanoparticles, $Ti_2O_5$ nanoparticles, and $BaTiO_3$ nanoparticles.

Optionally, a width range of the electrode portion comprises: 2 μm-6 μm; and/or, a width range of the slit portion comprises: 2 μm-8 μm.

Optionally, a ratio of a height of the insulation protrusion to a thickness of a liquid crystal layer is in a range of 0.4-0.6.

Optionally, for the orthographic projections in the plane where the substrate is located, a range of a distance between an edge of the reflection electrode and an edge of insulation protrusion on a same side relative to the reflection electrode and the insulation protrusion respectively comprises 0.3 μm-0.8 μm.

According to a second aspect of embodiments of the present disclosure, there is provided a liquid crystal display panel, comprising a color filter substrate, the array substrate according to any one of the above, and a liquid crystal layer disposed between the color filter substrate and the array substrate.

Optionally, the liquid crystal layer is made of blue phase liquid crystals.

According to a third aspect of embodiments of the present disclosure, there is provided a display apparatus, comprising the liquid crystal display panel according to any one of the above.

In the above embodiments according to the present disclosure, an electric field is fit to form between the second electrode and the first electrode, and an electric field is also fit to form between the reflection electrode and the second electrode, such that liquid crystal molecules in the full thickness of the liquid crystal layer are induced to enable birefringence when the liquid crystal display panel displays a picture with a gray level being non-zero. Thus, by effectively using ambient light, a transmittance of the liquid crystal display panel can be improved, and an aperture ratio of the liquid crystal display panel is increased. Further, an intensity of transmitted light can be adjusted by itself based on an intensity of ambient light.

It should be understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

Figure 1:
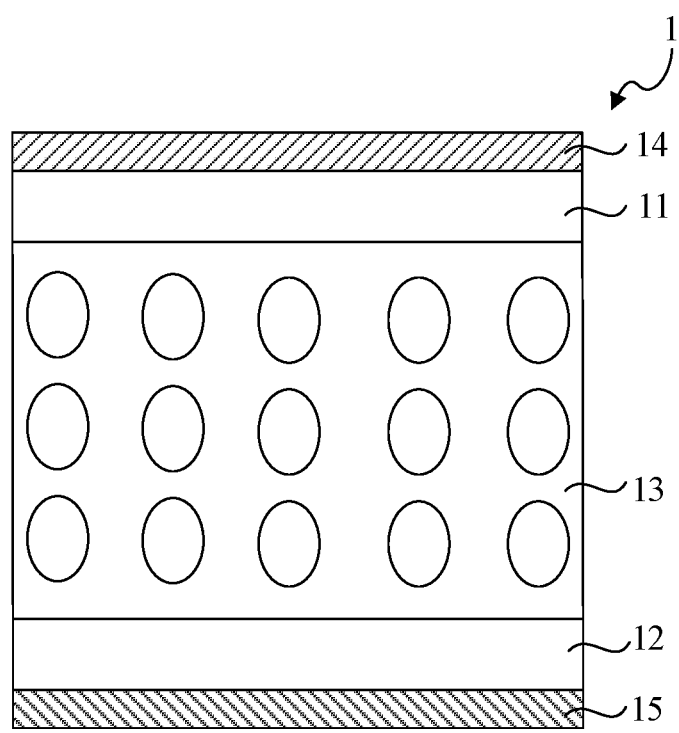
FIG. 1 is a schematic diagram illustrating a sectional structure of a liquid crystal display panel according to an embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

A working principle of display in ADS mode is that liquid crystals are driven to deflect with a multi-dimensional electric field generated using slit electrodes. In order to prevent the driven liquid crystal molecules to be in a mono-domain mode, that is, prevent the liquid crystal molecules from having single alignment which causes color shift to occur when watched from different angles, electrode portions of slit electrodes are disposed to include strip-shaped electrodes extending in different directions, so as to form electric fields in several directions, thus driving the liquid crystal molecules to enable multi-domain displaying.

However, due to superimposition of multiple electric fields at a bending portion of the electrode portion, the deflection of nearby liquid crystals will be in disorder, forming a drive "vacuum region", that is, the liquid crystals cannot be effectively driven and thus a "display dead region" is formed in the pixels. This reduces the transmittance of the liquid crystals and further reduces a contrast of the liquid crystal display panel. When used under high-brightness ambient light, insufficient gray level and contrast may occur, which severely affects display effect.

Figure 2:
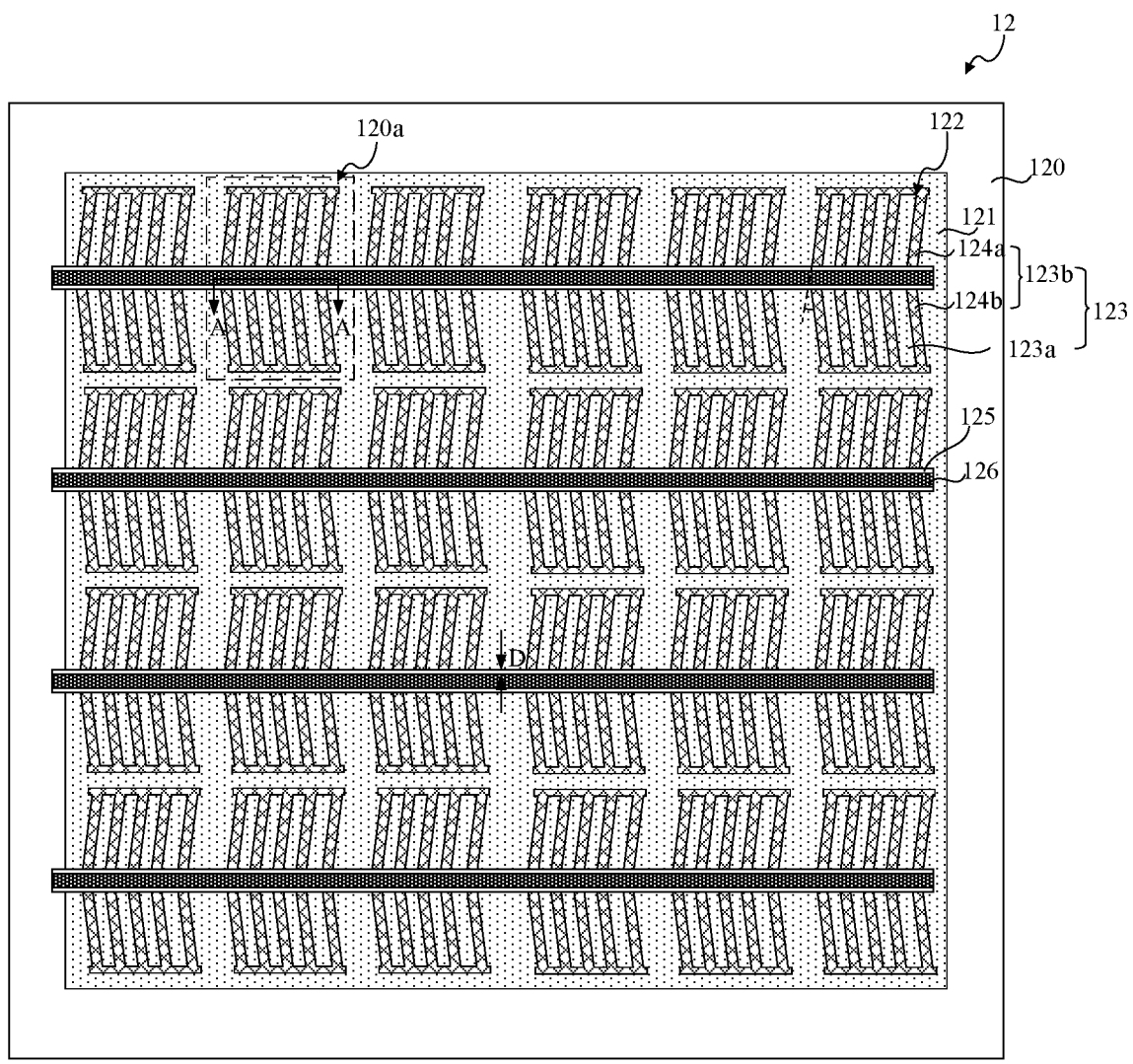
FIG. 2 is a schematic diagram illustrating a top view structure of an array substrate in FIG. 1.
Figure 3:
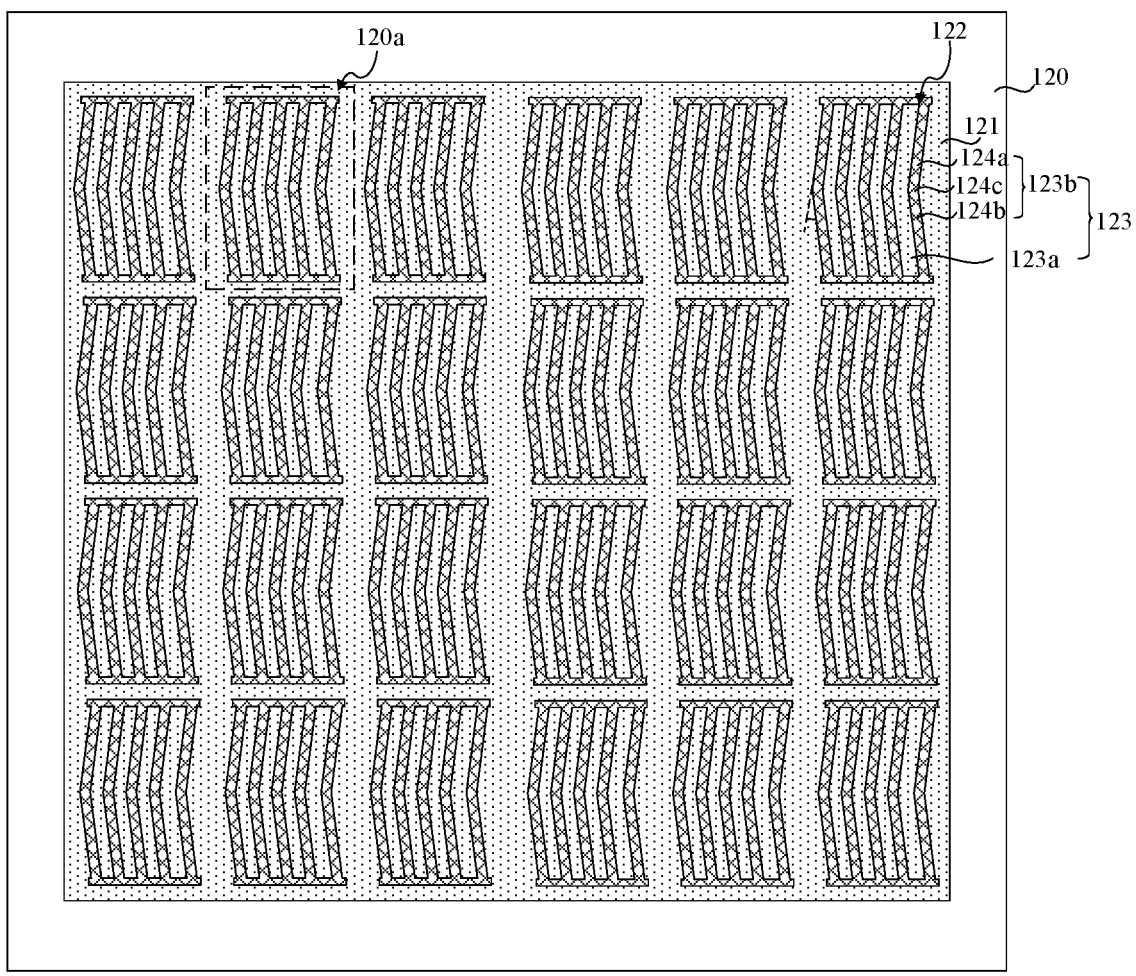
FIG. 3 is a schematic diagram illustrating a top view structure of an array substrate with an insulation protrusion and a reflection electrode in FIG. 2 removed.
Figure 4:
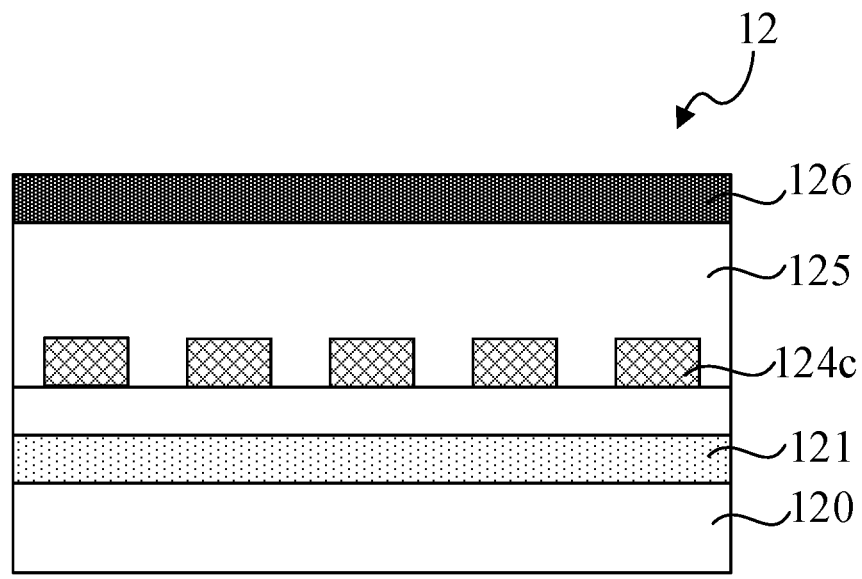
FIG. 4 is a sectional view taken along line A-A in FIG. 2.

FIG. 1 is a schematic diagram illustrating a sectional structure of a liquid crystal display panel according to an embodiment of the present disclosure. FIG. 2 is a schematic diagram illustrating a top view structure of an array substrate in FIG. 1. FIG. 3 is a schematic diagram illustrating a top view structure of an array substrate with an insulation protrusion and a reflection electrode in FIG. 2 removed. FIG. 4 is a sectional view taken along line A-A in FIG. 2.

As shown in FIGS. 1-4, the liquid crystal display panel 1 includes:
- a color filter substrate 11;
- an array substrate 12;
- a liquid crystal layer 13, disposed between the color filter substrate 11 and the array substrate 12;
- a first polarizer 14, disposed at a side of the color filter substrate 11 away from the liquid crystal layer 13; and
- a second polarizer 15, disposed at a side of the array substrate 12 away from the liquid crystal layer 13.

A material of the liquid crystal layer 13 may be Nematic liquid crystal. In order to ensure normal display of an image, a first alignment layer (not shown) may be disposed at a side of the color filter substrate 11 facing the liquid crystal layer 13, a second alignment layer (not shown) may be disposed at a side of the array substrate 12 facing the liquid crystal layer 13, and the first alignment layer and the second alignment layer are configured to cause the liquid crystal molecules to have an initial deflection angle.

A backlight (not shown) may be disposed at a side of the second polarizer 15 away from the array substrate 12. Polarization directions of the first polarizer 14 and the second polarizer 15 may be made perpendicular to each other to allow the light of the backlight to selectively pass through the liquid crystal display panel 1.

In some embodiments, the first polarizer 14 and/or the second polarizer 15 may be replaced with another structure capable of achieving light polarization.

As shown in FIGS. 2-4, the array substrate 12 includes a substrate 120 having a plurality of pixel regions 120a arranged in an array. Each of the pixel regions 120a includes:
- a first electrode 121;
- a second electrode 122, located at a side of the first electrode 121 away from the substrate 120, where an electric field is fit to form between the second electrode 122 and the first electrode 121, the second electrode 122 includes a slit electrode 123, the slit electrode 123 includes slit portions 123a and electrode portions 123b between adjacent slit portions 123a, the electrode portion 123b at least includes a first strip-shaped portion 124a and a second strip-shaped portion 124b, an extension direction of the first strip-shaped portion 124a intersects with an extension direction of the second strip-shaped portion 124b, and the first strip-shaped portion 124a and the second strip-shaped portion 124b of each electrode portion 123b are connected at a bending portion 124c;
- an insulation protrusion 125, located at a side of the second electrode 122 away from the first electrode 121, where an orthographic projection of the bending portions 124c of the second electrode 122 in a plane where the substrate 120 is located is within an orthographic projection of the insulation protrusion 125 in the plane where the substrate 120 is located; and
- a reflection electrode 126, located at a side of the insulation protrusion 125 away from the second electrode 122, where an electric field is fit to form between the reflection electrode 126 and the second electrode 122, and an orthographic projection of the reflection electrode 126 in the plane where the substrate 120 is located is within the orthographic projection of the insulation protrusion 125 in the plane where the substrate 120 is located.

The substrate 120 may be a hard substrate, for example, glass, or a soft substrate, for example, polyimide. A surface of the substrate 120 may be provided with several scan lines extending along a row direction and several data lines extending along a column direction. An intersection region of each scan line and each data line defines one pixel region 120a. Each pixel region 120a has a transistor, a source electrode of which is connected to the data line, a drain electrode is connected to a pixel electrode, and a gate electrode is connected to the scan line.

It is noted that the "row" in the embodiments of the present disclosure refers to an extension direction parallel to the scan line.

In one or more embodiments, the first electrode 101 is a common electrode, the second electrode is a pixel electrode, and an insulation layer may be used to achieve insulation therebetween. An electric field is fit to form between the common electrode and the pixel electrode to drive liquid crystal molecules to rotate. In other embodiments, the first electrode may alternatively be a pixel electrode and the second electrode is a common electrode.

In one or more embodiments, the common electrodes of different pixel regions 120a are connected to form a planar electrode. In other embodiments, the common electrode in each pixel region 120a may alternatively be a slit electrode.

In one or more embodiments, the pixel electrode adopts an electrode portion 123b having a double-domain structure. A width range of the electrode portion 123b may include 2 μm-6 μm. A width of the electrode portion 123b refers to a width size of the electrode portion 123b along a direction perpendicular to the extension direction of the electrode portion 123b. A width range of the slit portion 123a may include 2 μm-8 μm. A width of the slit portion 123a refers to a width size of the slit portion 123a along a direction perpendicular to the extension direction of the slit portion 123a.

It is noted that "range include" in the embodiments of the present disclosure refers to that two endpoint values are included.

In the embodiments shown in FIGS. 2 and 3, each slit electrode 123 includes five electrode portions 123b, and in other embodiments, the number of the electrode portions 123b may also be one, or two or another number. When the number of the electrode portions 123b is two or more, in one slit electrode 123, the first strip-shaped portions 124a of different electrode portions 123b may be parallel to each other, and the second strip-shaped portions 124b of different electrode portions 123b may be parallel to each other. Ends of the first strip-shaped portions 124a parallel to each other may be connected through a horizontal strip-shaped portion, and ends of the second strip-shaped portions 124b parallel to each other may be connected through a horizontal strip-shaped portion, as shown in FIGS. 2 and 3. In some embodiments, only the ends of the first strip-shaped portions 124a parallel to each other or the second strip-shaped portions 124b parallel to each other are connected through a horizontal strip-shaped portion. A voltage may be applied to each electrode portion through the horizontal strip-shaped portion. In one slit electrode 123, the insulation protrusions 125 above the bending portions 124c of different electrode portions 123b are preferentially connected together so as to connect together the reflection electrodes 126 above the bending portions 124c of the different electrode portions 123b, thereby facilitating application of voltage to the reflection electrodes 126.

Further, in some embodiments, the electrode portion 123b may also include a third strip-shaped portion, . . . , and an N-th strip-shaped portion, where N≥3. An extension direction of the N-th strip-shaped portion intersects with an extension direction of the (N−1)-th strip-shaped portion, and an M-th strip-shaped portion and an (M−1)-th strip-shaped portion of each electrode portion 123b are connected at the bending portion 124c, where M is any positive integer in a range of [2, N]. The insulation protrusions 125 above the different bending portions 124c of one electrode portion 123b are not connected together, but the reflection electrodes above the different bending portions 124c of one electrode portion 123b may be connected together, so as to facilitate application of a voltage to the reflection electrodes 126.

The material of the reflection electrode 126 may be a metal such as aluminum, silver or the like.

An electric field may also be formed between the reflection electrode 126 and the second electrode 122 to drive those liquid crystals at the side of the second electrode 122 away from the substrate 120 to rotate, thereby increasing the drive depth. Thus, a drive voltage of the liquid crystal display panel 1 can be reduced to some extent.

In some embodiments, the reflection electrode 126 may be electrically connected with the first electrode 121 to simplify a drive circuit. In some embodiments, the reflection electrode may alternatively be supplied with an additional drive voltage by the drive circuit.

As shown in FIG. 2, a range of a distance D between an edge of the reflection electrode 126 and an edge of the insulation protrusion 125 which are on a same side relative to the reflection electrode 126 and the insulation protrusion 125 respectively may include 0.3 μm-0.8 μm. In other words, the edge of the reflection electrode 126 and the edge of the insulation protrusion 125 on a same side relative to the reflection electrode 126 and the insulation protrusion 125 respectively are not aligned, which brings the benefit of preventing point discharge of the reflection electrode 126 and the electric fields from being too dense.

The insulation protrusion 125 is used to electrically insulate the reflection electrode 126 from the second electrode 122. A range of a ratio of a height of the insulation protrusion 125 to a thickness of the liquid crystal layer 13 may include 0.4-0.6, so as to increase a drive depth toward the liquid crystals.

The insulation protrusion 125 preferably adopts a material of a high dielectric constant, for example, of 20-30. Its benefit is that a potential drop will not be consumed on the insulation protrusion 125 but all consumed on deflection of the liquid crystal molecules, thus further helping to reduce the drive voltage and save energy consumption.

It is noted that "between" in the embodiments of the present disclosure refers to that two endpoint values are included.

Specifically, nanoparticles may be added to a transparent polymer to achieve a high dielectric constant. The transparent polymer may be polyimide or the like. The nanoparticles may include at least one of $TiO_2$ nanoparticles, $Ti_2O_5$ nanoparticles, or $BaTiO_3$ nanoparticles. In the insulation protrusion 125, a mass percentage of the nanoparticles may be 30%-40%.

Because the display drive mode of the liquid crystal display panel 1 is row scan, namely, one scan line turns transistors of one row of pixels on at the same time. In the pixel regions 120a of the same row, the reflection electrodes 126 above the bending portions 124c of respective second electrodes 122 may be applied with a same fixed voltage synchronously. As a result, in the embodiments shown in FIGS. 2 and 3, the insulation protrusions 125 and the reflection electrodes 126 may extend along a row direction, the orthographic projections of the bending portions 124c of the second electrodes 122 of one row of pixel regions 120a in the plane where the substrate 120 is located are within the orthographic projections of one corresponding row of the insulation protrusions 125 in the plane where the substrate 120 is located, and the orthographic projections of one row of reflection electrodes 126 in the plane where the substrate 120 is located are within the orthographic projections of one corresponding row of insulation projections 125 in the plane where the substrate 120 is located. In other words, in the pixel regions 120a of the same row, the insulation protrusions 125 above the bending portions 124c of respective second electrodes 122 may be connected together, and in the pixel regions 120a of the same row, the reflection electrodes 126 above the bending portions 124c of respective second electrodes 122 may be connected together.

Figure 5:
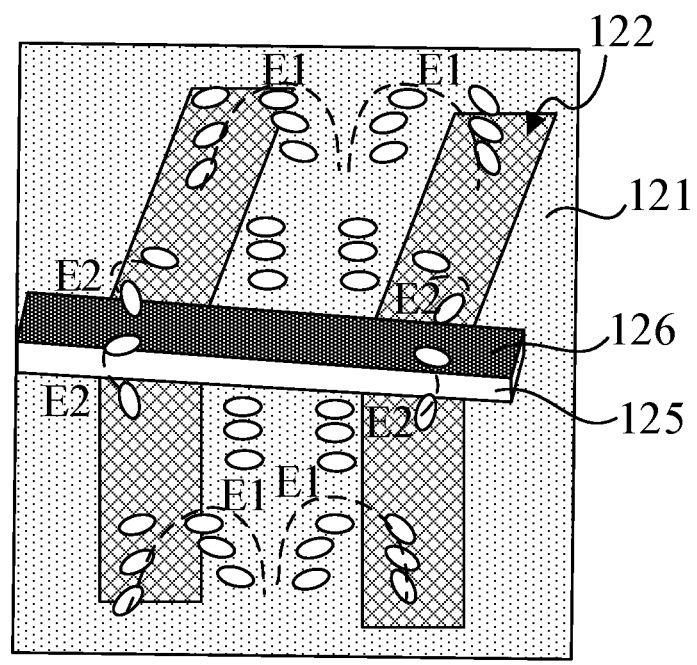
FIG. 5 is a schematic diagram illustrating a drive principle of a liquid crystal display panel in FIG. 1.
Figure 6:
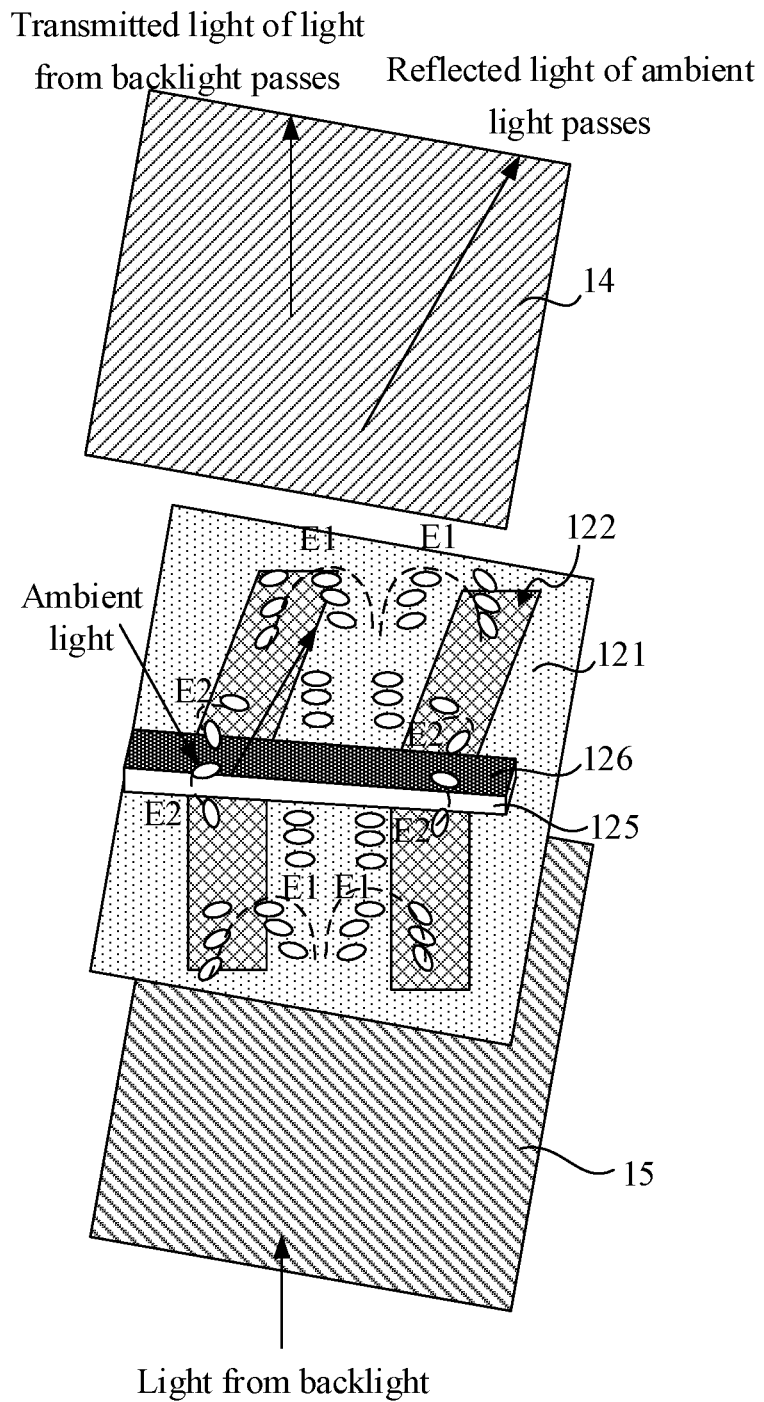
FIG. 6 is a principle diagram of backlight transmission and ambient light reflection when the liquid crystal display panel in FIG. 1 is driven.

FIG. 5 is a schematic diagram illustrating a drive principle of a liquid crystal display panel in FIG. 1. FIG. 6 is a principle diagram of transmission of light from backlight and reflection of ambient light when the liquid crystal display panel in FIG. 1 is driven. As shown in FIG. 5, when a picture with a gray level being non-zero is displayed, 0V is applied to the first electrode 121, and a drive voltage is applied to the second electrode (the electrode portions 123b of the slit electrode 123), and 0V (when the reflection electrode 126 is connected with the first electrode 121) or another fixed voltage (when the reflection electrode 126 is not connected with the first electrode 121) is applied to the reflection electrode 126. As shown in FIGS. 5, 6 and 3, an electric field E1 is formed between the first electrode 121 and the second electrode 122, and those liquid crystal molecules not around the bending portions 124c are induced by an electric field between the horizontal electrode (i.e. the first electrode) and the edges of the slit electrode 123 to achieve a display mode similar to an in-plane switching, thereby realizing higher transmittance and wider view angle contrast. An electric field E2 is formed between the reflection electrode 126 and the second electrode 122, such that those liquid crystal molecules around the bending portions 124c are deflected, and the polarized light formed by light from the backlight and passing through the second polarizer 15 can still pass through the region.

When ambient light is irradiated onto the above driven liquid crystal display panel 1, linearly polarized light is firstly obtained through the first polarizer 14. Since the liquid crystal molecules in the full thickness of the liquid crystal layer 13 are induced to enable double refraction, the linearly polarized lights are all formed into double-refracted lights after passing through the liquid crystal layer 13. After being reflected by the reflection electrodes 126, the double-refracted lights can enter the outside through the first polarizer 14. In other words, the liquid crystal display panel 1 of the embodiment can effectively use ambient light to improve the transmittance of the liquid crystal display panel 1, thereby increasing the aperture ratio of the liquid crystal display panel 1 (percentage of an effective display area to a total display region area).

When the intensity of the ambient light is high, there will be a high requirement for a contrast between the display brightness of the liquid crystal display panel 1 and the intensity of the ambient light, otherwise, unclear displaying will occur. Because the liquid crystal display panel 1 of this embodiment can use the reflection electrodes 126 to reflect ambient light to increase display brightness, the liquid crystal display panel 1 can adjust the intensity of the transmitted light by itself based on the intensity of the ambient light in addition to increasing its aperture ratio.

Figure 7:
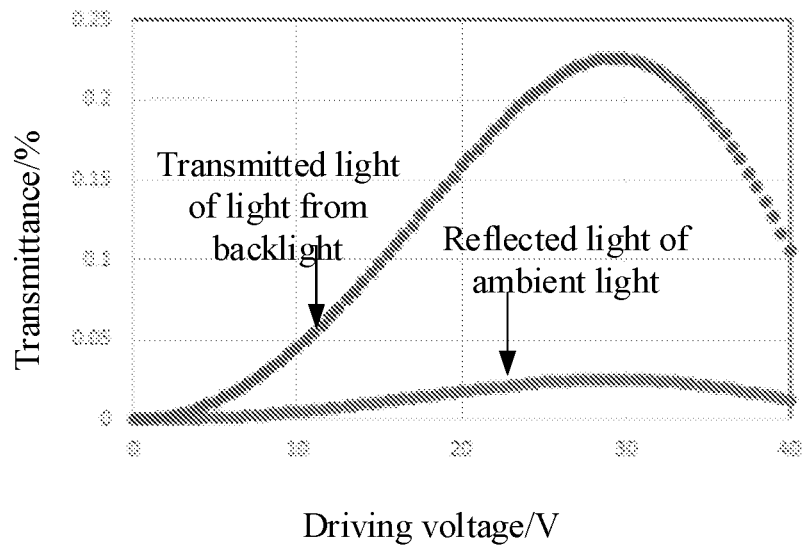
FIG. 7 is a relational diagram of a transmittance and a drive voltage.

In a case that 0V is applied to the first electrode 121, the drive voltage is applied to the second electrode 122, and 0V (when the reflection electrode 126 is connected to the first electrode 121) is applied to the reflection electrode 12: when the height of the insulation protrusion 125 is ½ of the thickness of the liquid crystal layer 13, a same optical path difference can be achieved between the ambient light and reflected light, and between light from the backlight and transmitted light, and thus a maximum transmittance can be achieved under a same drive voltage. In order to verify the above conclusion, FIG. 7 provides a relational diagram of the transmittance and the drive voltage. It can be seen that when the height of the insulation protrusion 125 is ½ of the thickness of the liquid crystal layer 13, under the drive voltage of 30V, the intensity of the reflected light/ambient light and the intensity of the transmitted light/light from the backlight are both maximal, thereby achieving the maximum transmittance.

Figure 8:
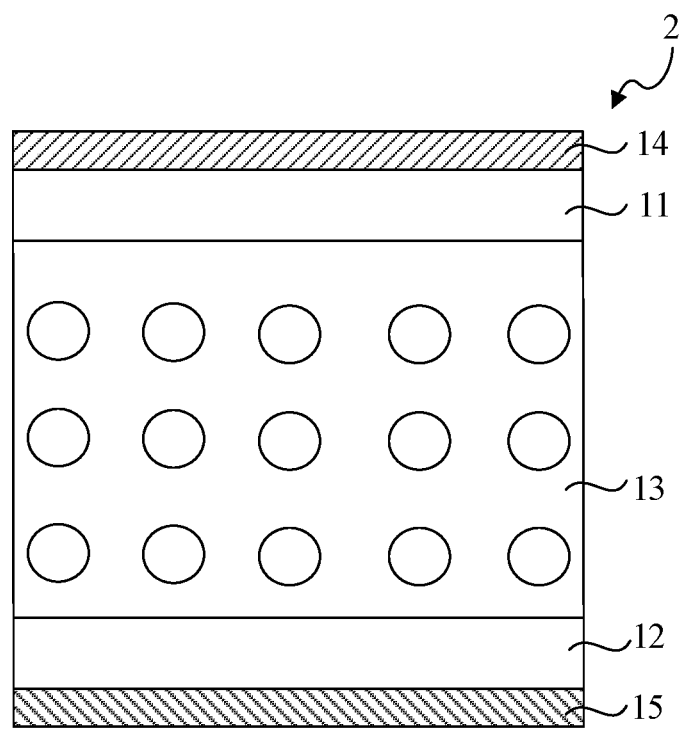
FIG. 8 is a schematic diagram illustrating a sectional structure of a liquid crystal display panel according to another embodiment of the present disclosure.

FIG. 8 is a schematic diagram illustrating a sectional structure of a liquid crystal display panel according to another embodiment of the present disclosure. As shown in FIG. 8, the liquid crystal display panel 2 of this embodiment is basically identical to the liquid crystal display panel 1 of the embodiments of FIGS. 1-7, except for that the material of the liquid crystal layer 13 is a blue phase liquid crystal.

Different from the fact that the Nematic liquid crystal behaves as anisotropic medium without drive voltage applied, the blue phase liquid crystal behaves as isotropic medium without drive voltage applied. Therefore, in the liquid crystal display panel 2, the first alignment layer and the second alignment layer may be omitted.

Figure 9:
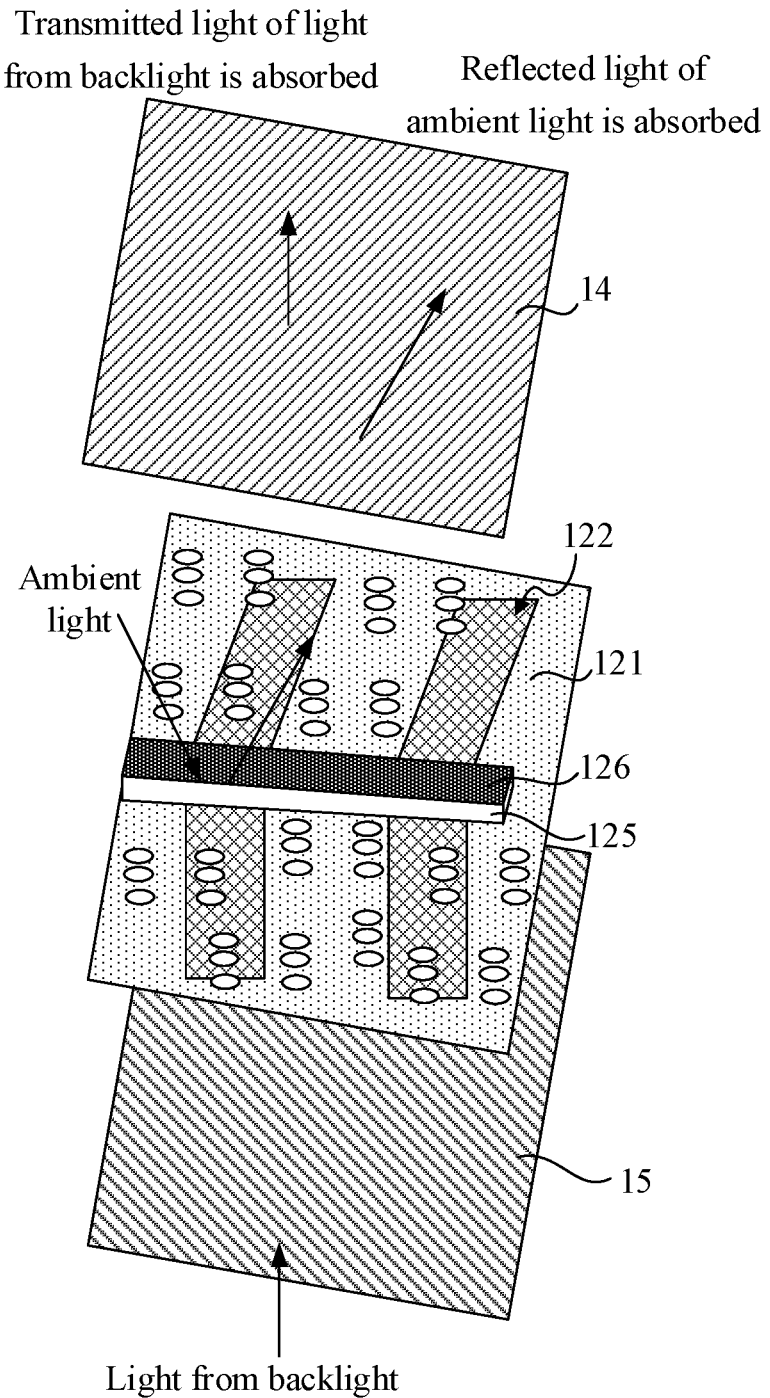
FIG. 9 is a principle diagram of backlight transmission and ambient light reflection when the liquid crystal display panel in FIG. 8 is not driven.

Furthermore, the isotropic medium has no selectivity for light refraction, and therefore, the liquid crystal display panel 2 always has a good dark state when observed from different angles. FIG. 9 is a principle diagram of transmission of light from the backlight and reflection of ambient light when the liquid crystal display panel in FIG. 8 is not driven. As shown in FIGS. 8 and 9, when a picture with a gray level being zero is displayed, 0V is applied to all of the first electrode 121, the second electrode 122 and the reflection electrode 126, and the blue phase liquid crystal presents isotropy. The good dark state results from the fact that: linearly polarized light is obtained after the ambient light passes through the first polarizer 14; when the linearly polarized light is incident to the reflection electrode 126 at Brewster angle, the reflected linearly polarized light is rotated 90° and can be fully absorbed by the first polarizer 14, leading to no emergent light; if the linearly polarized light is incident to the reflection electrode 126 at non-Brewster angle, the reflected linearly polarized light will change into elliptically polarized light, most of which can be absorbed by the first polarizer 14, leading to less emergent light. As a result, the liquid crystal display panel 2 can adjust the intensity of the transmitted light by itself according to the intensity of the ambient light.

When the drive voltage is applied to the blue phase liquid crystal, Kerr effect will occur, and the blue phase liquid crystal behaves as anisotropic medium. The linearly polarized light will be double-refracted after passing through the blue phase liquid crystal subjected to Kerr effect. Thus, when a picture with a gray level being non-zero is displayed, the liquid crystal display panel 2 is identical in drive mode and principle to those of the liquid crystal display panel 1.

Since the Kerr effect of the blue phase liquid crystal has an ms-level response speed, the response speed of the liquid crystal display panel 2 is higher than that of the liquid crystal display panel 1.

In some embodiments, the array substrates 12 in the liquid crystal display panels 1 and 2 may also be manufactured and sold as semi-finished products.

Based on the liquid crystal display panels 1 and 2, one or more embodiments of the present disclosure further provide a display apparatus including any one of the above liquid crystal display panels 1 and 2. The display apparatus may be electronic paper, smart phone, tablet computer, television, laptop computer, digital photo frame, and navigator and other product or component which has display function.

It should be noted that in the accompanying drawings, for illustration clarity, the sizes of the layers and regions may be exaggerated. Furthermore, it may be understood that when an element or layer is referred to as being "on" another element or layer, such element or layer may be directly on the another element or layer or there is an intermediate layer therebetween. Further, it is understood that when an element or layer is referred to as being "under" another element or layer, such element or layer may be directly under the another element or layer, or one or more intermediate elements or layers are present therebetween. In addition, it may also be understood that when a layer or element is referred to as being between two layers or elements, such layer or element may be a sole layer between the two layers or elements, or one or more intermediate layers or elements are present. Like reference signs in the descriptions indicate like elements.

In the present disclosure, the terms "first" and "second" are used only for descriptions, and shall not be understood as indicating or implying relative importance.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. An array substrate, comprising a substrate, wherein the substrate has a plurality of pixel regions arranged in an array and each of the pixel regions comprises:
   a first electrode;
   a second electrode, located at a side of the first electrode away from the substrate, wherein an electric field is fit to form between the second electrode and the first electrode, the second electrode comprises a slit electrode, the slit electrode comprises a plurality of electrode portions and one or more slit portions each arranged between adjacent electrode portions, each of the electrode portions at least comprises a first strip-shaped portion and a second strip-shaped portion, an extension direction of the first strip-shaped portion intersects with an extension direction of the second strip-shaped portion, and the first strip-shaped portion and the second strip-shaped portion of each electrode portion are connected at a corresponding bending portion;
   an insulation protrusion, located at a side of the second electrode away from the first electrode, wherein an orthographic projection of bending portions of the second electrode in a plane where the substrate is located is within an orthographic projection of the insulation protrusion in the plane where the substrate is located; and
   a reflection electrode, located at a side of the insulation protrusion away from the second electrode, wherein an electric field is fit to form between the reflection electrode and the second electrode, and an orthographic projection of the reflection electrode in the plane where the substrate is located is within the orthographic projection of the insulation protrusion in the plane where the substrate is located.

2. The array substrate of claim 1, wherein the reflection electrode is electrically connected with the first electrode.

3. The array substrate of claim 1, wherein the insulation protrusion extends along a row direction, and orthographic projections of bending portions of the second electrodes of one row of the pixel regions in the plane where the substrate is located are within orthographic projections of one corresponding row of insulation protrusions in the plane where the substrate is located.

4. The array substrate of claim 3, wherein the reflection substrate extends along the row direction, and orthographic projections of one row of the reflection electrodes in the plane where the substrate is located are within orthographic projections of one corresponding row of the insulation protrusions in the plane where the substrate is located.

5. The array substrate of claim 1, wherein the first electrode is a common electrode and the second electrode is a pixel electrode.

6. The array substrate of claim 5, wherein common electrodes of the plurality of pixel regions are connected to form a planar electrode.

7. The array substrate of claim 1, wherein a dielectric constant of the insulation protrusion is between 20 and 30; and/or, a material of the insulation protrusion comprises at least one of $TiO_2$ nanoparticles, $Ti_2O_5$ nanoparticles, and $BaTiO_3$ nanoparticles.

8. The array substrate of claim 1, wherein a width range of the electrode portion comprises: 2 μm-6 μm; and/or, a width range of the slit portion comprises: 2 μm-8 μm.

9. The array substrate of claim 1, wherein a ratio of a height of the insulation protrusion to a thickness of a liquid crystal layer is in a range of 0.4-0.6.

10. The array substrate of claim 1, wherein, for the orthographic projections in the plane where the substrate is located, a range of a distance between an edge of the reflection electrode and an edge of the insulation protrusion on a same side relative to the reflection electrode and the insulation protrusion respectively comprises 0.31 μm-0.81 μm.

11. A liquid crystal display panel, comprising: a color filter substrate, an array substrate, and a liquid crystal layer disposed between the color filter substrate and the array substrate;
   wherein the array substrate comprises a substrate, the substrate has a plurality of pixel regions arranged in an array and each of the pixel regions comprises:

a first electrode;

a second electrode, located at a side of the first electrode away from the substrate, wherein an electric field is fit to form between the second electrode and the first electrode, the second electrode comprises a slit electrode, the slit electrode comprises a plurality of electrode portions and one or more slit portions each arranged between adjacent electrode portions, each of the electrode portions at least comprises a first strip-shaped portion and a second strip-shaped portion, an extension direction of the first strip-shaped portion intersects with an extension direction of the second strip-shaped portion, and the first strip-shaped portion and the second strip-shaped portion of each electrode portion are connected at a corresponding bending portion;

an insulation protrusion, located at a side of the second electrode away from the first electrode, wherein an orthographic projection of bending portions of the second electrode in a plane where the substrate is located is within an orthographic projection of the insulation protrusion in the plane where the substrate is located; and a reflection electrode, located at a side of the insulation protrusion away from the second electrode, wherein an electric field is fit to form between the reflection electrode and the second electrode, and an orthographic projection of the reflection electrode in the plane where the substrate is located is within the orthographic projection of the insulation protrusion in the plane where the substrate is located.

12. The liquid crystal display panel of claim 11, wherein the crystal liquid layer is made of blue phase liquid crystals.

13. The liquid crystal display panel of claim 11, wherein the reflection electrode is electrically connected with the first electrode.

14. The liquid crystal display panel of claim 11, wherein the insulation protrusion extends along a row direction, and orthographic projections of bending portions of the second electrodes of one row of the pixel regions in the plane where the substrate is located are within orthographic projections of one corresponding row of insulation protrusions in the plane where the substrate is located.

15. The liquid crystal display panel of claim 14, wherein the reflection substrate extends along the row direction, and orthographic projections of one row of the reflection electrodes in the plane where the substrate is located are within orthographic projections of one corresponding row of the insulation protrusions in the plane where the substrate is located.

16. The liquid crystal display panel of claim 11, wherein the first electrode is a common electrode and the second electrode is a pixel electrode.

17. The liquid crystal display panel of claim 16, wherein common electrodes of the plurality of pixel regions are connected to form a planar electrode.

18. The liquid crystal display panel of claim 11, wherein a dielectric constant of the insulation protrusion is between 20 and 30; and/or, a material of the insulation protrusion comprises at least one of $TiO_2$ nanoparticles, $Ti_2O_5$ nanoparticles, and $BaTiO_3$ nanoparticles.

19. The liquid crystal display panel of claim 11, wherein a ratio of a height of the insulation protrusion to a thickness of the liquid crystal layer is in a range of 0.4-0.6.

20. A display apparatus comprising the liquid crystal display panel of claim 11.

* * * * *